(12) United States Patent
Griffin et al.

(10) Patent No.: US 11,489,682 B2
(45) Date of Patent: **\*Nov. 1, 2022**

(54) PREDICTING UTILIZATION OF A SHARED COLLABORATION RESOURCE

(71) Applicant: Cisco Technology, Inc., San Jose, CA (US)

(72) Inventors: Keith Griffin, County Galway (IE); Eric Yi-hua Chen, Palo Alto, CA (US); Daniel Victor Eskenazi, Chapel Hill, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,140

(22) Filed: Feb. 26, 2021

(65) Prior Publication Data

US 2021/0258180 A1    Aug. 19, 2021

Related U.S. Application Data

(63) Continuation of application No. 15/361,828, filed on Nov. 28, 2016, now Pat. No. 10,938,587.

(51) Int. Cl.
*H04L 12/18* (2006.01)
(52) U.S. Cl.
CPC ................. *H04L 12/1818* (2013.01)
(58) Field of Classification Search
CPC .................................................. H04L 12/1818
See application file for complete search history.

(56) References Cited

U.S. PATENT DOCUMENTS

| 7,356,770 | B1  | 4/2008  | Jackson            |
|-----------|-----|---------|--------------------|
| 7,885,845 | B2  | 2/2011  | Mizrachi et al.    |
| 8,326,793 | B1  | 12/2012 | Bowers et al.      |
| 8,346,589 | B1* | 1/2013  | Norton ............... G06Q 10/1093 |
|           |     |         | 705/7.18           |
| 8,375,034 | B2  | 2/2013  | Norton et al.      |
| 8,645,463 | B2  | 2/2014  | Knight et al.      |
| 9,143,460 | B2  | 9/2015  | Dhara et al.       |
| 9,317,826 | B2  | 4/2016  | Bank et al.        |
| 9,955,313 | B1  | 4/2018  | Bacarella et al.   |
| 9,955,428 | B1  | 4/2018  | Bacarella et al.   |

(Continued)

OTHER PUBLICATIONS

R. Goldstein, et al., "Space Layout in Occupant Behavior Simulation", Proceedings of Building Simulation 2011: 12th Conference of International Building Performance Simulation Association, Sydney, Nov. 14-16, 2011, 8 pages.

(Continued)

*Primary Examiner* — Viet D Vu
(74) *Attorney, Agent, or Firm* — Edell, Shapiro & Finnan, LLC

(57) ABSTRACT

Presented herein are techniques and systems associated with generating a predicted utilization likelihood for a shared collaboration resource. Integrated resource data associated with a meeting scheduled for a shared collaboration resource is obtained and analyzed using a machine-learned predictive model. The analysis generates a predicted utilization likelihood of the shared resource. An indication of the predicted utilization likelihood is provided to an output system, such as a graphical user interface.

20 Claims, 7 Drawing Sheets

(56) References Cited

U.S. PATENT DOCUMENTS

| | | | |
|---|---|---|---|
| 2008/0075118 A1 | 3/2008 | Knight et al. | |
| 2010/0049579 A1* | 2/2010 | Suzuki | G06Q 10/1095 726/33 |
| 2010/0070314 A1* | 3/2010 | Jethani | G06Q 10/02 705/6 |
| 2012/0109873 A1* | 5/2012 | Xiong | G06Q 30/01 706/52 |
| 2012/0179502 A1* | 7/2012 | Farooq | H04L 12/1818 705/7.13 |
| 2012/0310376 A1* | 12/2012 | Krumm | G05B 15/02 700/31 |
| 2013/0262366 A1 | 10/2013 | Hjelm et al. | |
| 2014/0046716 A1* | 2/2014 | Black | G06Q 10/06314 705/7.19 |
| 2016/0180259 A1* | 6/2016 | Marianko | H04L 51/043 705/5 |
| 2016/0277242 A1 | 9/2016 | Sallam | |
| 2017/0068906 A1 | 3/2017 | Korycki et al. | |
| 2017/0083872 A1 | 3/2017 | Blomberg et al. | |
| 2017/0132647 A1* | 5/2017 | Bostick | G06Q 30/0205 |
| 2017/0278120 A1 | 9/2017 | Bateman | |
| 2017/0308866 A1 | 10/2017 | Dotan-Cohen et al. | |
| 2018/0084078 A1 | 3/2018 | Yan | |
| 2018/0107988 A1 | 4/2018 | Codella et al. | |
| 2018/0115170 A1 | 4/2018 | Bacarella et al. | |
| 2018/0157984 A1 | 6/2018 | O'Herlihy et al. | |
| 2019/0130365 A1* | 5/2019 | Pell | G06Q 10/1095 |

OTHER PUBLICATIONS

Tae Wan Kim, et al., "Improving Facility Performance Prediction by Formalizing an Activity-Space-Performance Model", CIFE, Center For Integrated Facility Engineering, CIFE Technical Report #TR210, Oct. 2012, Stanford University, 43 pages.

Mike Kinney et al., "Gathering Workspace Utilization Data", Asure Software, Apr. 20, 2014, 8 pages; downloaded from Internet Aug. 29, 2019, https://www.asuresoftware.com/blog/gathering-workspace-utilization-data/.

HermanMiller, "Herman Miller Space Utilization Services", 2 pages; downloaded from Internet Aug. 29, 2019.

AsureSpace Software, "A whole new workplace strategy", AsureSpace SmartView solutions, 2 pages; downloaded from Internet Aug. 29, 2019.

Asure Software, "Space Utilization Occupancy Detection System", 3 pages; downloaded from Internet Aug. 29, 2019, http://web.archive.org/web/20160807202222/http://www.asuresoftware.com:80/products/space-utilization/.

EMS Software, "Space and Room Utilization Reports", 7 pages; downloaded from Internet Aug. 29, 2019, http://web.archive.org/web/20160409053621/https://www.emssoftware.com/what-we-do/utilization-statistics.

Dennis Mortensen, "How to teach a machine to understand us", 6 pages; downloaded from Internet Aug. 29, 2019, https://x.ai/blog/how-to-teach-a-machine-to-understand-us/.

* cited by examiner

| RESOURCES | FRIDAY, JULY 22 | | | | | | | | |
|---|---|---|---|---|---|---|---|---|---|
| | 9AM | 10AM | 11AM | 12AM | 1PM | 2PM | 3PM | 4PM | 5PM |
| ROOM A | HOST: user1@example.com<br>PLANNED UTILIZATION: 100%<br>PREDICTED UTILIZATION: 0% | | | | HOST: user2@example.com<br>PLANNED UTILIZATION: 90%<br>PREDICTED UTILIZATION: 80% | | HOST: user5@example.com<br>PLANNED UTILIZATION: 65%<br>PREDICTED UTILIZATION: 20% | | |
| ROOM B | | | HOST: user2@example.com<br>PLANNED UTILIZATION: 80%<br>PREDICTED UTILIZATION: 70% | | | HOST: user5@example.com<br>PLANNED UTILIZATION: 95%<br>PREDICTED UTILIZATION: 75% | | HOST: user1@example.com<br>PLANNED UTILIZATION: 65%<br>PREDICTED UTILIZATION: 0% | |
| ROOM C | HOST: user4@example.com<br>PLANNED UTILIZATION: 85%<br>PREDICTED UTILIZATION: 72% | | | | HOST: user3@example.com<br>PLANNED UTILIZATION: 60%<br>PREDICTED UTILIZATION: 10% | | | HOST: user4@example.com<br>PLANNED UTILIZATION: 75%<br>PREDICTED UTILIZATION: 65% | |

FIG.5

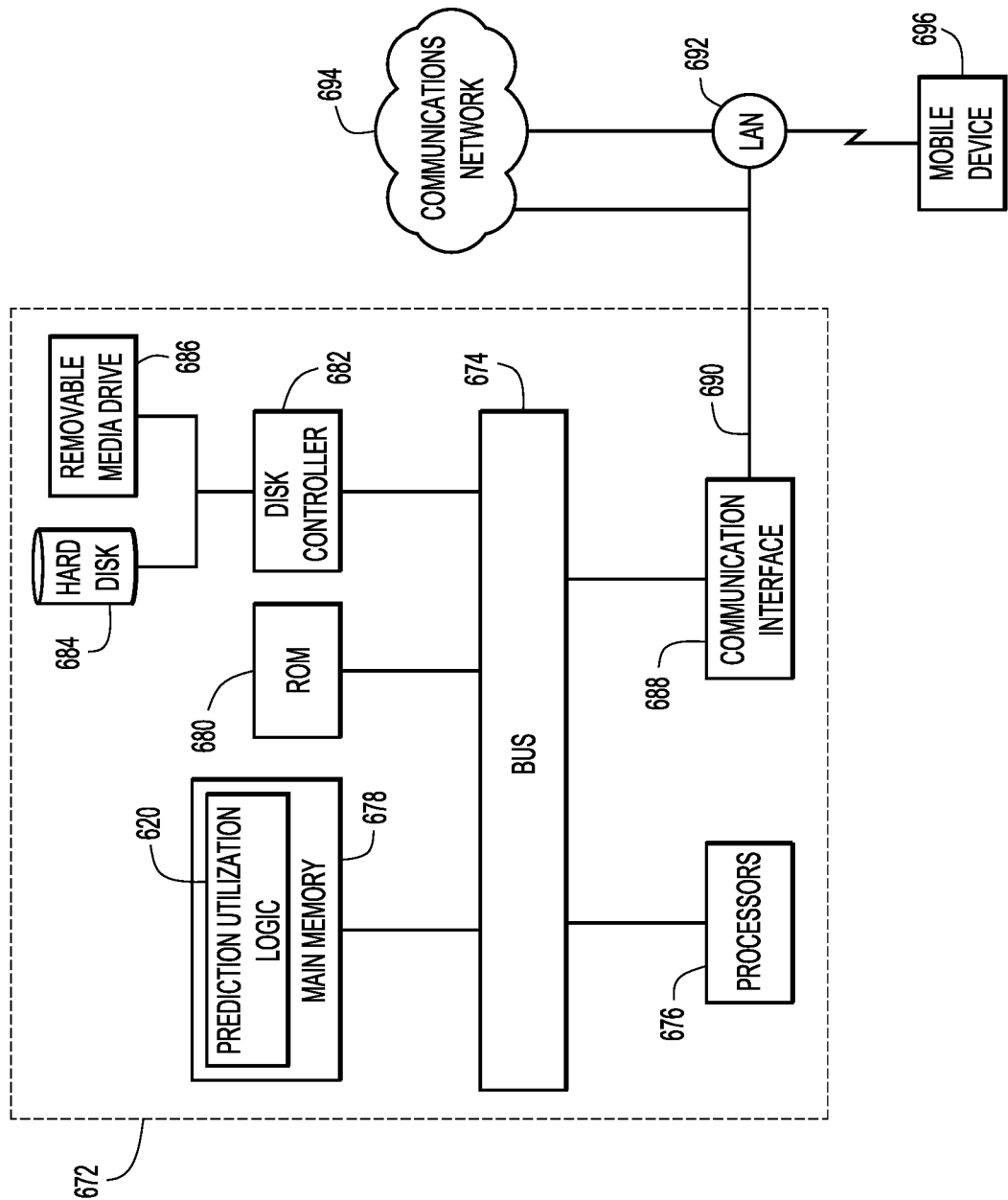

PREDICTING UTILIZATION OF A SHARED COLLABORATION RESOURCE

CROSS-REFERENCE TO RELATED APPLICATION

This application is a continuation of and claims the benefit of priority to U.S. patent application Ser. No. 15/361,828, filed Nov. 28, 2016 and issued as U.S. Pat. No. 10,938,587, the entire contents of which are incorporated herein by reference.

TECHNICAL FIELD

The present disclosure relates to shared collaboration resources.

BACKGROUND

Shared collaboration resources, such as conference rooms (physical or virtual rooms), videoconferencing equipment, telepresence equipment, teleconference bridges, etc. are often insufficient to accommodate all of the users that may wish to use the shared collaboration resources at a given time. This is particularly problematic in large enterprises/organizations where many users and many different groups of users compete for limited collaboration resources. To facilitate collaboration resource sharing, reservation/collaboration systems have been developed to allow users to reserve collaboration resources in advance. However, a common problem is that reserved collaboration resources are often left underutilized/idle at the reserved time.

BRIEF DESCRIPTION OF THE DRAWINGS

FIG. 5 is a graphical user interface displaying an example indication of a predicted utilization likelihood of a shared collaboration resource, according to an example embodiment.

FIG. 6 is a block diagram of a computing device configured to execute resource utilization prediction techniques, according to an example embodiment.

DESCRIPTION OF EXAMPLE EMBODIMENTS

Overview

Presented herein are techniques and systems associated with generating a predicted utilization likelihood for a shared collaboration resource. Integrated resource data associated with a meeting scheduled for a shared collaboration resource is obtained and analyzed using a machine-learned predictive model. The analysis generates a predicted utilization likelihood of the shared resource. An indication of the predicted utilization likelihood is provided to an output system, such as a graphical user interface.

Example Embodiments

Figure 1:
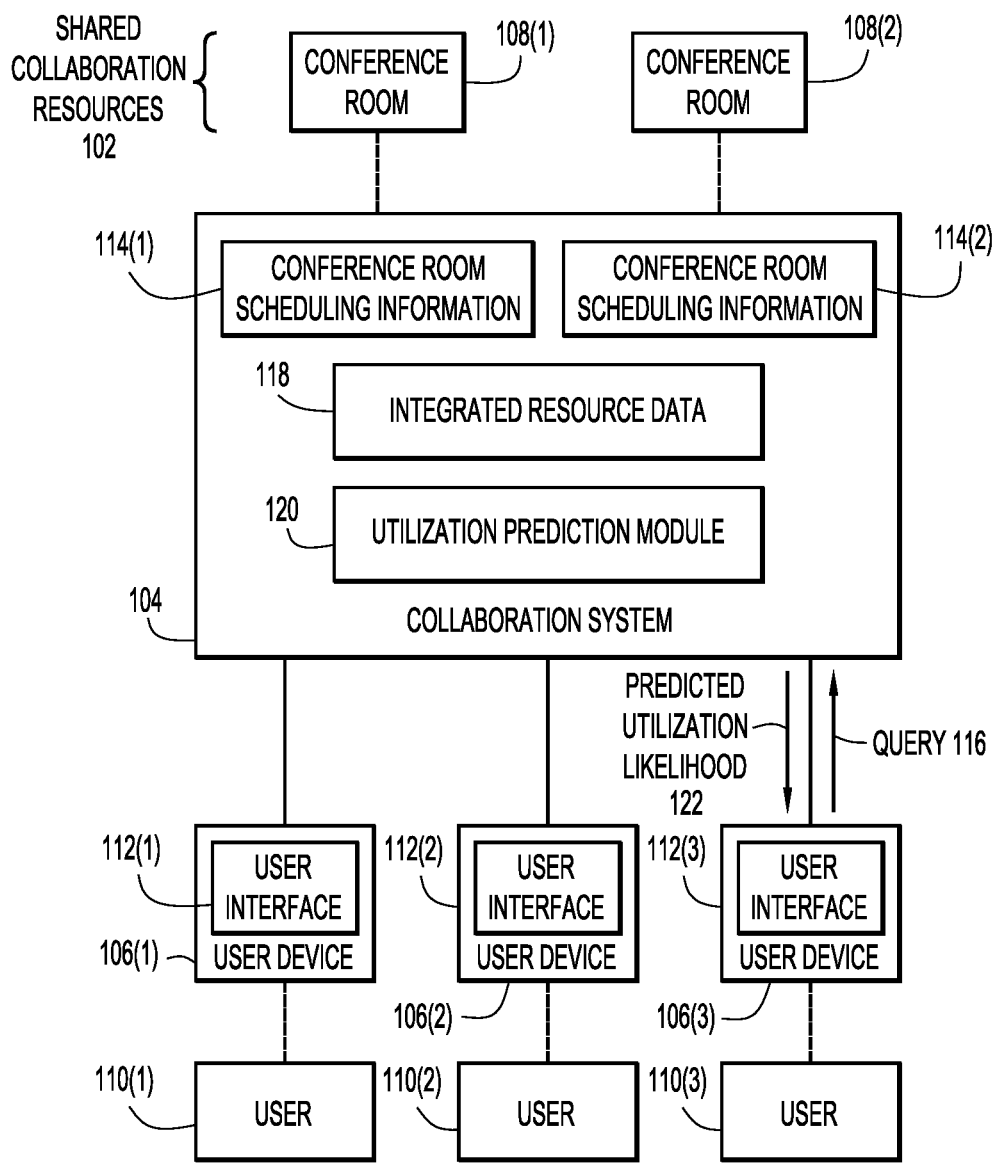
FIG. 1 is a block diagram illustrating an enterprise environment configured to execute resource utilization prediction techniques, according to an example embodiment.

Referring first to FIG. 1, shown is an enterprise/organization environment 100 configured to execute resource utilization prediction techniques in accordance with examples presented herein. The enterprise environment 100 comprises one or more shared collaboration resources 102, a collaboration system 104, and a plurality of user devices 106(1), 106(2), and 106(3), that each includes a respective user interface (UI) 122(1), 112(2), and 112(3).

In the example of FIG. 1, the one or more shared collaboration resources 102 comprise two physical conference rooms 108(1) and 108(2). It is to be appreciated that the illustration of two physical conference rooms 108(1) and 108(2) as the shared collaboration resources 102 is merely for ease of illustration and that, in accordance with examples presented herein, the shared collaboration resources may include different numbers and types of collaboration resources, such as virtual conference/meeting rooms, videoconferencing equipment, telepresence equipment, teleconference bridges, etc. Also for ease of illustration, the collaboration system 104 is shown as a stand-alone entity. It is to be appreciated that, in practice, a collaboration system 104 may comprise one or more hardware or software components that are distributed across one or more physical devices (e.g., one or more servers, one or more computing devices, etc.).

Returning to the specific example of FIG. 1, a user 110(1) at user device 106(1) initially reserves conference room 108(1) for a selected date and time (selected time). The reservation may be made via the collaboration system 104 or some other scheduling/reservation system (not shown) that cooperates with the collaboration system 104. For example, the user 110(1) can send a reservation request from the user device 106(1) to the collaboration system 104. The collaboration system 104 analyzes conference room reservation/scheduling information 114(1) that is associated with the conference room 108(1) to determine whether or not the conference room 108(1) is available (i.e., to determine whether the conference room 108(1) is currently reserved during the selected time). In this example, the collaboration system 104 determines that the conference room 108(1) is available and, as such, the collaboration system 104 permits user 110(1) to reserve conference room 108(1) for the selected time. In other words, the user 110(1) schedules a "meeting" for the conference room 108(1).

Similarly, a user 110(2) at user device 106(2) reserves conference room 108(2) via the collaboration system 104 for the same selected time. As above, the user 110(2) sends a reservation request to the collaboration system 104 which then analyzes conference room reservation/scheduling information 114(2) associated with conference room 108(2) to determine whether or not the conference room 108(2) is available. In this example, the collaboration system 104 determines that the conference room 108(2) is available and, as such, the collaboration system 104 permits user 110(2) to reserve conference room 108(2) for the selected time. In other words, the user 110(2) schedules a meeting for the conference room 108(2).

As noted above, enterprises/organizations may have limited collaboration resources that are often shared by many users. At times, these shared collaboration resources are insufficient to accommodate all users. This problem is compounded by conventional collaboration systems, particularly those that permit reoccurring reservations, when a reserved collaboration resource is left underutilized/idle at the reserved time. For example, in the example of FIG. 1, another user 110(3) at user device 106(3) may also wish to schedule a meeting for a conference room at the same selected time. In conventional collaboration systems, the user 110(3) is left with no recourse and is forced to schedule his/her meeting at a different time. In contrast, the techniques presented herein improve operation of the collaboration system 104 by enabling the collaboration system 104 to maximize utilization of the shared collaboration resources that are controlled by the collaboration system. More specifically, as described further below, the techniques presented herein generate predicted utilization likelihoods for shared resources. These predicted utilization likelihoods allow the collaboration system 104 to determine whether a shared collaboration resource is likely to be left underutilized, even though it is reserved through the collaboration system 104. As a result, the predicted utilization likelihoods can trigger one or more actions by the collaboration system 104 to make users aware that the shared resource is likely to be left idle.

For example, in the example of FIG. 1, upon determining that conference rooms 108(1) and 108(2) are both reserved, the user 110(3) may initiate a resource utilization prediction process at collaboration system 104. In accordance with examples presented herein, the resource utilization prediction process is configured to determine/estimate a likelihood or probability that each of the conference rooms 108(1) and 108(2) will actually be used for the scheduled meeting (i.e., used at the selected time). More specifically, as described further below, the collaboration system 104, and more particularly a utilization prediction module 120, executes a machine-learned predictive model to determine a likelihood that each of the conference rooms 108(1) and 108(2) will actually be used for the scheduled meeting (i.e., calculates a numerical value that represents whether the conference room is likely to be used at the time of the reservation). The likelihood that a shared collaboration resource will be used at a given time is referred to herein as the "predicted utilization likelihood" for the associated shared collaboration resource.

In one illustrative example, the user device 106(3) sends a query, which is represented in FIG. 1 by arrow 116, to the collaboration system 104 requesting predicted utilization likelihoods for each of conference rooms 108(1) and 108(2) at the selected time. In response to receipt of the query 116, the utilization prediction module 120 uses the machine-learned predictive model to analyze integrated resource data 118 to generate the predicted utilization likelihoods for each of conference rooms 108(1) and 108(2). As described further below, the integrated resource data 118 is, in general, data/information associated with, or having the possibility to effect, utilization of the conference rooms 108(1) and 108(2) at the selected time. As shown by arrow 122, the collaboration system 104 is configured to provide the predicted utilization likelihoods for each of conference rooms 108(1) and 108(2) back to user device 106(3). The user device 106(3) may then display the predicted utilization likelihoods 122 for each of conference rooms 108(1) and 108(2) at the user interface 112(3).

The user 110(3) may take any of a number of different actions based upon the predicted utilization likelihoods 122 for conference rooms 108(1) and 108(2). For example, if the predicted utilization likelihoods 122 indicate that it is likely that one of the conference rooms 108(1) and 108(2) will go unutilized at the selected time, then the user 110(3) may contact the owner of the conference room reservation (i.e., user 110(1) and/or 110(2)) to inquire about whether they plan to actually use the conference room. It is to be appreciated that the predicted utilization likelihoods 122 may also or alternatively be used in a number of other manners.

Figure 2:
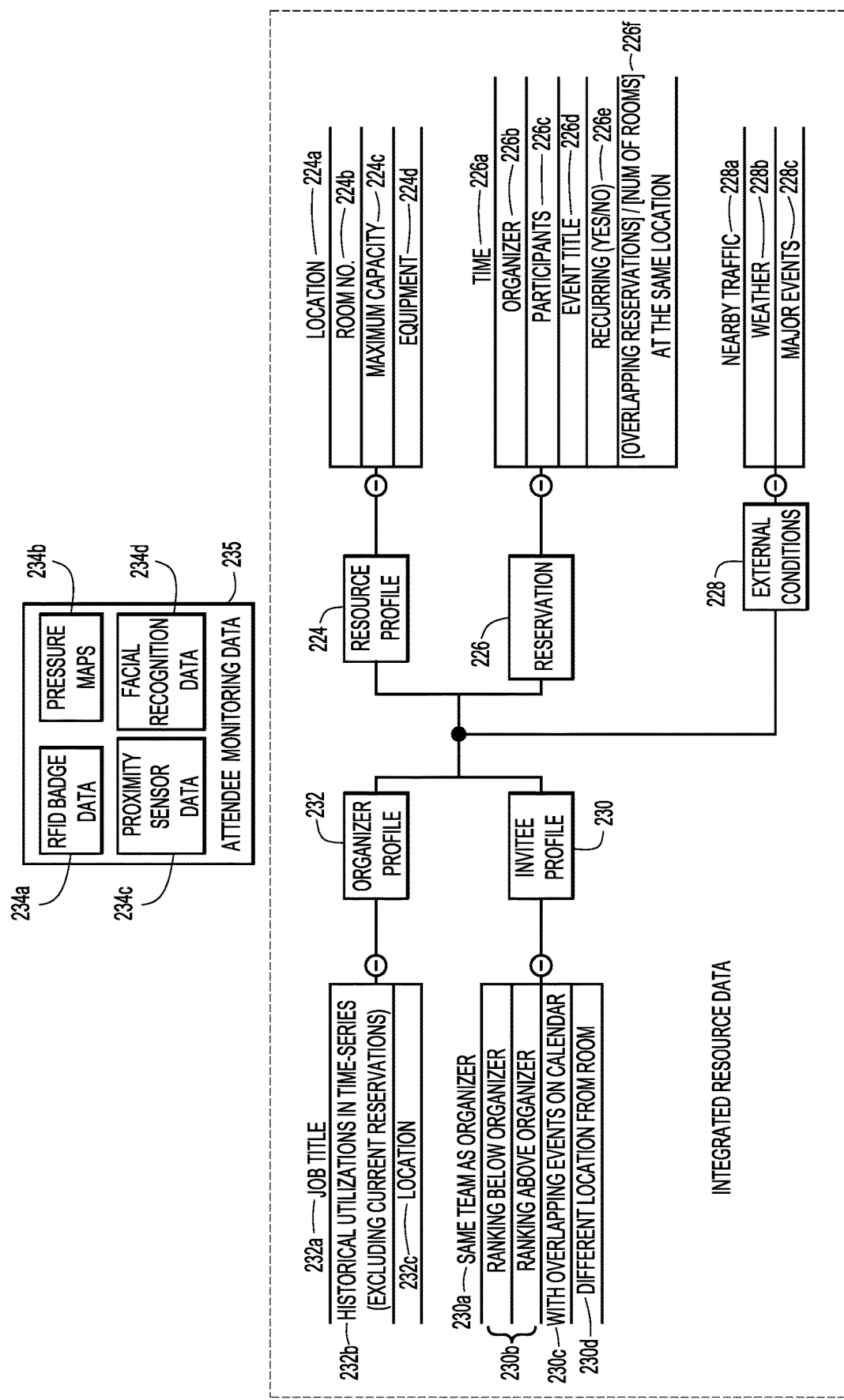
FIG. 2 is a diagram depicting various categories of integrated resource data and attendee monitoring data, according to an example embodiment.

As noted above, the utilization prediction module 120 uses the integrated resource data 118 to generate the predicted utilization likelihoods for each of conference rooms 108(1) and 108(2). Also as noted, the integrated resource data 118 is information associated with, or having the possibility to effect, utilization of the conference rooms 108(1) and 108(2) at the selected time. FIG. 2 is a diagram depicting various categories of integrated resource data 118 that may be used to generate predicted utilization likelihoods for each of conference rooms 108(1) and 108(2) in accordance with examples provided herein.

In general, the integrated resource data 118 is data obtained from the collaboration system 104 or another electronic system integrated with the collaboration system. The integrated resource data 118 is data obtained before the start of a meeting and is used for the generation of the predicted utilization likelihoods.

The integrated resource data 118 can generally be classified as: resource profile information 224, reservation information 226, external condition information 228, invitee profile information 230, and organizer profile information 232. The resource profile information 224 is data characterizing the collaboration resource that is reserved at the selected time. For example, the resource profile information 224 may include one or more of: location information 224*a* (e.g., the physical location of a conference room), number or name information 224*b* (e.g., room number), capacity information 224*c* (e.g., size or maximum capacity of the room), equipment information 224*d* (e.g., identification of the type of collaboration equipment installed in the conference room), etc.

Reservation information 226 is data relating to the resource (e.g., room) reservation itself. For example, reservation information 226 may include one or more of: reservation time/timing information 226*a* (e.g., date, start time, duration, end time, etc.), organizer information 226*b* (e.g., data indicating the reservation organizer/owner), participant information 226*c* (e.g., information regarding the invitees of the meeting, possibly including which invitees have or have not indicated that they will attend the meeting), event title information 226*d*, recurrence information 226*e* (i.e., indication of whether the event is recurring), information relating to the number of overlapping reservation divided by the number of rooms at the same location 226*f*, etc. Additionally, natural language processing and/or information retrieval techniques (e.g., bag-of-word) may be applied to the event title information 226*d* to gauge the importance of the meeting.

External condition information 228 is data relating to outside/external conditions that may affect the utilization of the collaboration resource at the time of the reservation. For example, external condition information 228 may include one or more of: nearby traffic information 228*a* (e.g., traffic alerts near the physical location of the shared resource), weather information 228*b* (e.g., weather alerts near the physical location of the shared resource), and/or other major event information 228*c*.

Invitee profile information 230 relates to information concerning the invitees to the meeting scheduled for the shared resource. The invitee profile information 230 may include one or more of: team information 230*a* (i.e., information indicating whether an invitee is on the same team as an organizer), invitee ranking information 230b (e.g., where the invitee ranks in the hierarchy of the enterprise, whether an invitee ranks below the organizer, whether the invitee ranks above the organizer, etc.), overlap information 230c (e.g., whether an invitee has events that overlap with the meeting marked on the invitee's calendar), invitee location information 230d (e.g., whether the invitee is in a different site from the shared resource), etc.

Organizer profile information 232 relates to information concerning the organizer or organizers of the meeting. For example, the organizer profile information 232 may include one or more of: job title information 232a (i.e., an indication of the organizer's job title) and/or information indicating where the organizer ranks in the hierarchy of the enterprise, organizer historical utilization information 232b (i.e., information relating to the organizers historical utilization of reserved resources, including reservations within a same time-series), organizer location information 232c, etc.

It is to be appreciated that the integrated resource data 118 is separate and distinct from attendee monitoring data/information 235 which is data collected from one or more physical sensors and are metrics of the presence of a person during a meeting. The attendee monitoring data 235 represents the actual utilization of the resource (e.g., conference room) at the time of a scheduled meeting (i.e., indicates whether a meeting attendee (organizer or invitee) actually makes use of a resource at the scheduled time). The attendee monitoring data 235 can be used to sure that the utilization is fulfilled by at least one intended participant in order to distinguish it from random walk-ins by others (i.e., person who use the room because the room is unused despite the reservation).

In certain examples, the attendee monitoring data 235 can include data representing the location of attendees at various times. The attendee data 235 may include, for example, radio-frequency identification (RFID) badge data 234a, pressure maps 234b, proximity sensor data 234c, facial recognition data 234d (e.g., based on video camera data), etc.

In summary of FIG. 2, the attendee monitoring data 235 is data generated from one or more physical sensors and is used to determine the actual utilization of a resource at the time of a reservation. In contrast, the integrated resource data 118 does not include physical sensor data and is data obtained prior to a meeting that can be used to predict whether or not a resource is likely to be used a future time.

Figure 3:
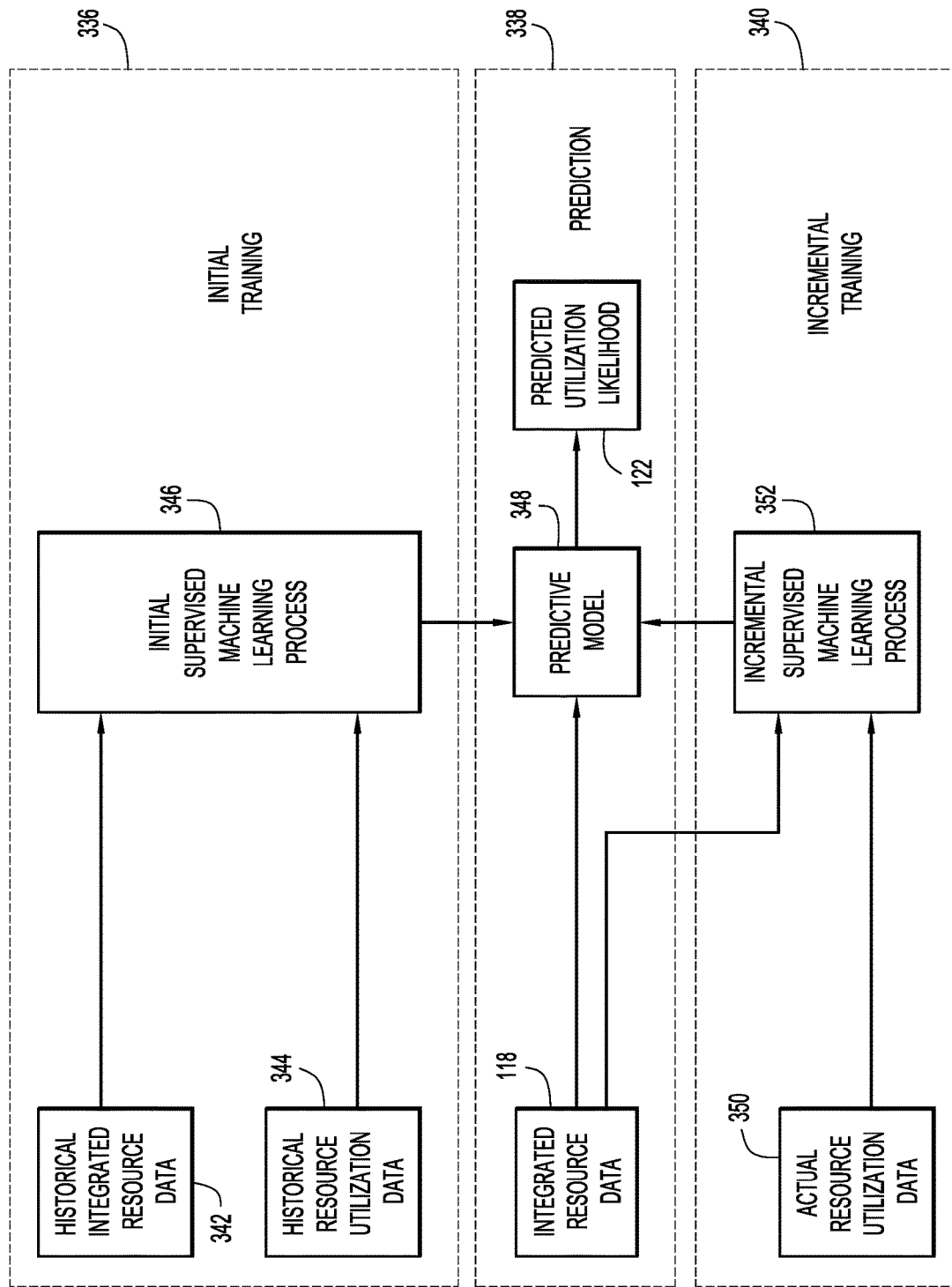
FIG. 3 is a diagram illustrating generation and use of a machine-learned predictive model, according to an example embodiment.

FIG. 3 is a diagram illustrating further details of the operation of a utilization prediction module, such as module 120 of FIG. 1, in accordance with embodiments presented herein. For ease of illustration, FIG. 3 will be described with reference to the enterprise environment 100 of FIG. 1 and as including three stages, referred to as an initial training stage 336, a prediction stage 338, and an incremental training stage 340.

In the initial training stage 336, the utilization prediction module 120, and more particularly, one or more supervised machine learning processes 346, are "trained" to generate predicted utilization likelihoods for various shared resources. More specifically, historical resource integrated resource data 342 and historical resource utilization data 344 are provided to the one or more initial machine learning processes 346. The historical integrated resource data 342 is data/information that is associated with previous/past meetings that reserved the shared collaboration resources (i.e., conference rooms 108(1) and 108(2)) and, in general, includes data similar to resource integrated resource data 118 shown in FIG. 2 (e.g., historical resource profile information, historical reservations, historical external conditions, historical invitee profiles, historical organizer profiles, etc.). The supervised machined learning processes 346 may be any one or more of a number of types of machine learning processes, such as a stochastic gradient descent (SGD) Regressor process, a Passive Aggressive Regressor process, etc.

The historical resource utilization data 344 includes data relating to actual (i.e., observed) utilization of the conference rooms 108(1) and 108(2) during the previous meetings that reserved the shared collaboration resources. In certain examples, the historical resource utilization data 344 may be used to determine the number of actual participants of a past meeting. The historical resource utilization data 344 may be obtained from a number of different sources and may overlap with the attendee monitoring data. In one example, this data may be obtained by monitoring meeting join means and location of the attendees (e.g., an online conference meeting from home). In further examples, various technologies may be leveraged to obtain a headcount of the number of people that entered the conference room during the past meeting and, in certain examples, to obtain the identities of the individuals in the conference room. For instance, cameras coupled with facial detection and/or recognition capabilities, room telepresence system pairing (e.g., ultrasonic proximity pairing and/or Bluetooth Low Energy beacons), Wi-Fi® (e.g., using the Connected Mobile Experience of Cisco Systems, Inc.), acoustic analysis (i.e., echo locations), infra-red, badge readers, and other types of passive or active sensors may be used to determine the presence and/or identity of individuals within a conference room. In certain examples, if a roster of a meeting is generated, the roster information can be used to validate camera data (i.e., enhance/verify facial recognition as a means of identifying occupants). That is, if a roster exists, it could be used as a validation mechanism to measure actual occupancy and/or to determine whether users scheduled to be in a room joined from elsewhere.

Obtaining the identities of participants can help verify whether the individuals present in the conference room at the time of the meeting are the intended participants of the reservation. For instance, when a room is reserved but not utilized by the intended participants, other people may use the unoccupied (yet reserved) room for a different meeting purpose. In this case, merely acquiring a headcount while failing to identify the people in the room can result in an inaccurate (i.e., nonzero) historical room utilization for that particular past meeting. By contrast, if the people in the room are identified, the historical actual room utilization for the past meeting would be zero. Thus, the identities of participants are useful to increase the accuracy of the prediction operations. In addition, it may also be possible to analyze the conference bridge joined (if any) via the room's built-in conferencing resources (i.e. in-room telepresence system, speakerphone, etc.) as an additional means of determining whether the room was utilized in order to attend the reserved/intended meeting. In general, analysis of the conference bridge refers to an analysis of data associated with dialed phone numbers dialed, joined online meetings, etc.

A historical actual utilization of a conference room may be calculated based on the historical resource utilization data 344. For example, the historical actual utilization may be calculated by dividing the number of actual participants in the past meeting by some metric indicative of the initially planned attendance, such as the maximum capacity of the conference room, the number of attendees that accepted invites, etc. The historical actual utilization for a past meeting is normally a numerical value in the range from 0.0 (i.e., there were no actual participants in the past meeting) to 1.0 (i.e., the conference room was fully utilized). However, in some cases, the historical actual utilization for a past meeting may be greater than one when the conference room is over-utilized (i.e., when the number of actual participants in the past meeting exceeded the maximum capacity of the conference room).

Returning to the example of FIG. 3, the initial training 336 results in the generation of a predictive model 348 that, as described below, is configured to generate real-time predicted utilization likelihoods for various shared resources. In other words, the predictive model 348 is the product/output of one or more supervised machine learning processes 346 that have been trained on actual historical data for shared collaboration resources.

As noted above, in the prediction stage 338, the predictive model 348 is configured to generate real-time predicted utilization likelihoods for various shared resources, such as the conference rooms 108(1) and 108(2). More specifically, the predictive model 348 generates the predicted utilization likelihoods based on analysis of the integrated resource data 118 associated with one or more reservations for the shared collaboration resource(s). Since the predictive model 348 is the product of one or more supervised machine learning processes 346, the predicted utilization likelihoods are estimated/based on the integrated resource data 118 for the shared collaboration resources (i.e., conference rooms 108 (1) and 108(2)). As such, the predictive model 348 is sometimes referred to herein as a machine-learned predictive model.

In certain cases, the machine-learned predictive model 348 may encounter a combination of attributes that is different from any of those observed in the historical integrated resource data 342 and, as a result, the real-time predicted utilization likelihoods can be inaccurate. Additionally, concept drift (i.e., user behavior changes over time) can occur, which also leads to inaccurate predictions. The incremental training stage 340 is configured to regularly update the machine-learned predictive module 348 to account for these factors and, accordingly, improve future predictions based on observed data. In one example, the incremental training stage 340 obtains real-time actual/observed resource utilization data 350 associated with the shared resources. In general, the actual resource utilization data 350 is similar to the historical resource utilization data 344.

The actual resource utilization data 350, as well as the integrated resource data 118, are used as inputs to one or more supervised incremental machine learning processes 352. In one example, the incremental machine learning processes 352 are configured to compare the predicted utilization likelihoods 122 and the actual utilization data 350. Based on this comparison, the incremental machine learning process 352 updates the predictive model 348, thereby improving the accuracy of future predictions. In certain examples, the predictive module 348 may weight the new data (i.e., data associated with the comparison) more than the historical integrated resource data 342 or the historical utilization data 344. The machine learning processes 352 may be the same or different from the machine learning processes 346.

In general, the incremental training stage 340 may operate as a periodic or continuous loop to regularly update the machine-learned predictive model 348. In other words, the machine-learned predictive model 348 may be incrementally updated based on the predicted utilization likelihood and the actual utilization, but not on the historical integrated resource data 342 and historical utilization data 344. Thus, each incremental training stage 340 requires a relatively small amount of new data and can be performed in near real-time.

Figure 4:
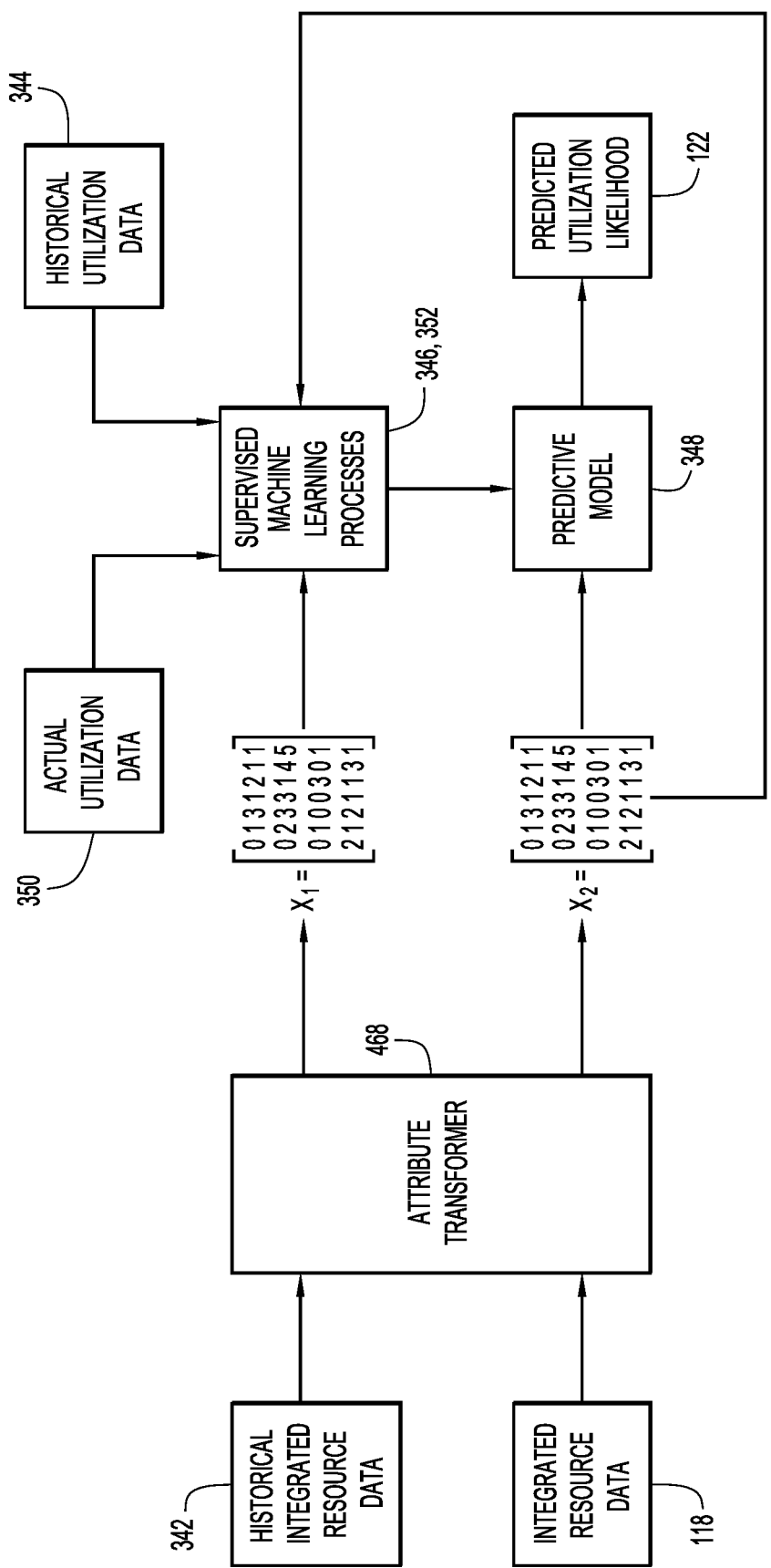
FIG. 4 is a diagram illustrating generation of a predicted utilization likelihood of a shared collaboration resource, according to an example embodiment.

FIG. 4 is a diagram illustrating further details for the generation of a predicted utilization likelihood of an example shared collaboration resource, such as conference room 108(1), in accordance with the resource utilization prediction techniques presented. As detailed above, the resource utilization prediction techniques may make use of a number of different types of data from a number of different sources, including historical integrated resource data 342, historical resource utilization data 344, integrated resource data 118, and actual resource utilization data 350. These various pieces of data may be either numerical, categorical or text. In accordance with the examples presented herein, numerical attribute values are normalized into a range from 0 to 1. Categorical attributes are transformed into binary variables using, for example, one-hot encoding, and text attributes are converted into binary variables using, for example, bag-of-word techniques. This process is performed by an attribute or feature transformer 468 which, in essence, transforms the original integrated resource data into a numerical matrix that can be understood by the machine learning processes. Each row in the matrix corresponds to all attributes associate with each resource reservation. Similarly, past utilization data is expressed in a numerical vector (e.g. [0.0, 0.5, 0.3, 1.0, 0.0]), in which each value is the actual utilization corresponds to each resource reservation in the past. FIG. 4 illustrates two matrices $X_1$ and $X_2$. Matrix $X_1$ is a numerical matrix corresponding to historical integrated resource data 342, matrix $X_2$ is a numerical matrix corresponding to integrated resource data 118. Each row in numerical matrices $X_1$ and $X_2$ may correspond, respectively, to all attributes associated with each room reservation.

FIG. 5 is a graphical user interface (GUI) 500 displaying example indications of a predicted utilization likelihood of a shared collaboration resource, according to an example embodiment. The graphical user interface 500 displays a plurality of reservation blocks 502 for three conference rooms, referred to as "Room A," "Room B," and "Room C" on a specific day (Friday, July 22) within the time period of 9 AM through 6 PM. Each reservation block 502 shows that a user has reserved the associated conference room for the specified time period. In accordance with the examples presented herein, each reservation block 502 provides a host indication 570, a planned utilization indication 572, and an indication 574 of a predicted utilization likelihood for the underlying resource (predicted utilization indication). The host indication 570 may indicate the user that has reserved the room, possibly including contact information (phone number, email, etc.). The planned utilization indication 572 may be a numerical representation of the number of planned meeting participants (e.g., the percentage of invitees who indicated that they would attend the meeting). The predicted utilization indication 574 is a numerical representation of the predicted utilization likelihood.

For example, reservation block 502 indicates that user1 has reserved Room A from 9 AM through 12 PM on Friday, July 22. Although all invitees responded affirmatively to the invitation (as indicated by the 100% planned utilization indication), the indication 574 of predicted utilization likelihood displays 0%, suggesting the predictive model has predicted that no one will attend the meeting. As noted, the predicted utilization indication 574 allows a user or system that wishes to hold a meeting in the same room at the same time as the reservation to determine whether the conference room is likely to be left underutilized/idle at the time of the reservation. In certain examples, a reservation block may be colored, shaded, or otherwise flagged to indicate whether the underlying resource is likely to be utilized or unutilized at the reserved time.

The graphical user interface 500 of FIG. 5 is an example of an output system that is configured to receive and display an indication of a predicted utilization likelihood. It is to be appreciated an indication of a predicted utilization likelihood may also or alternatively be provided to other types of output systems, such as automated meeting scheduling system alternative resource recommendation system based on predicted results (suggest groups with low predicted utilization to use smaller rooms), resource request pool system (allow multiple parties to request for a popular resource and give it to the party with the highest predicted utilization), reservation reconfirmation system (sends the host of a warning if the predicted utilization is 0% and asks for reconfirmation), etc.

FIG. 6 is a block diagram of a computing device (e.g., server) 672 configured to execute utilization prediction techniques, according to an example embodiment. The computing device 672 includes a bus 674 or other communication mechanism for communicating information, and one or more processors 676 coupled with the bus 674 for processing the information. While FIG. 6 shows a single block 676 for the processors, it should be understood that the processors 676 may represent a plurality of processing cores, each of which can perform separate processing operations. The computing device 672 also includes a main memory 678, such as a random access memory (RAM) or other dynamic storage device (e.g., dynamic RAM (DRAM), static RAM (SRAM), and synchronous DRAM (SD RAM)), coupled to the bus 674 for storing information and instructions to be executed by processors 676. In addition, the main memory 678 may be used for storing temporary variables or other intermediate information during the execution of instructions by the processor 676. The main memory 678 may include prediction utilization logic 620 that, when executed by one or more of the processors 676, is configured to enable the computing device 672 to perform the resource utilization prediction process.

The computing device 672 further includes a read only memory (ROM) 680 or other static storage device (e.g., programmable ROM (PROM), erasable PROM (EPROM), and electrically erasable PROM (EEPROM)) coupled to the bus 674 for storing static information and instructions for the processor 676.

The computing device 672 also includes a disk controller 682 coupled to the bus 674 to control one or more storage devices for storing information and instructions, such as a magnetic hard disk 684, and a removable media drive 686 (e.g., floppy disk drive, read-only compact disc drive, read/write compact disc drive, compact disc jukebox, tape drive, and removable magneto-optical drive). The storage devices may be added to the computing device 672 using an appropriate device interface (e.g., small computer system interface (SCSI), integrated device electronics (IDE), enhanced-IDE (E-IDE), direct memory access (DMA), or ultra-DMA).

The computing device 672 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computing device 672 performs a portion or all of the processing steps of the process in response to the processor 676 executing one or more sequences of one or more instructions contained in a memory, such as the main memory 678. Such instructions may be read into the main memory 678 from another computer readable medium, such as a hard disk 684 or a removable media drive 686. One or more processors in a multi-processing arrangement may also be employed to execute the sequences of instructions contained in main memory 678. In alternative embodiments, hard-wired circuitry may be used in place of or in combination with software instructions. Thus, embodiments are not limited to any specific combination of hardware circuitry and software.

As stated above, the computing device 672 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computing device 672, for driving a device or devices for implementing the process, and for enabling the computing device 672 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computing device 672 also includes a communication interface 688 coupled to the bus 674. The communication interface 688 provides a two-way data communication coupling to a network link 690 that is connected to, for example, a local area network (LAN) 692, or to another communications network 694 such as the Internet. For example, the communication interface 688 may be a wired or wireless network interface card to attach to any packet switched (wired or wireless) LAN. As another example, the communication interface 688 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 688 sends and receives electrical, electromagnetic or optical signals that carry digital data streams representing various types of information.

The network link 690 typically provides data communication through one or more networks to other data devices. For example, the network link 690 may provide a connection to another computer through a local are network 692 (e.g., a LAN) or through equipment operated by a service provider, which provides communication services through a communications network 694. The local network 690 and the communications network 694 use, for example, electrical, electromagnetic, or optical signals that carry digital data streams, and the associated physical layer (e.g., CAT 5 cable, coaxial cable, optical fiber, etc.). The signals through the various networks and the signals on the network link 690 and through the communication interface 688, which carry the digital data to and from the computing device 672 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computing device 672 can transmit and receive data, including program code, through the network(s) 692 and 694, the network link 690 and the communication interface 688. Moreover, the network link 690 may provide a connection through a LAN 692 to a mobile device 696 such as a personal digital assistant (PDA) laptop computer, or cellular telephone.

Figure 7:
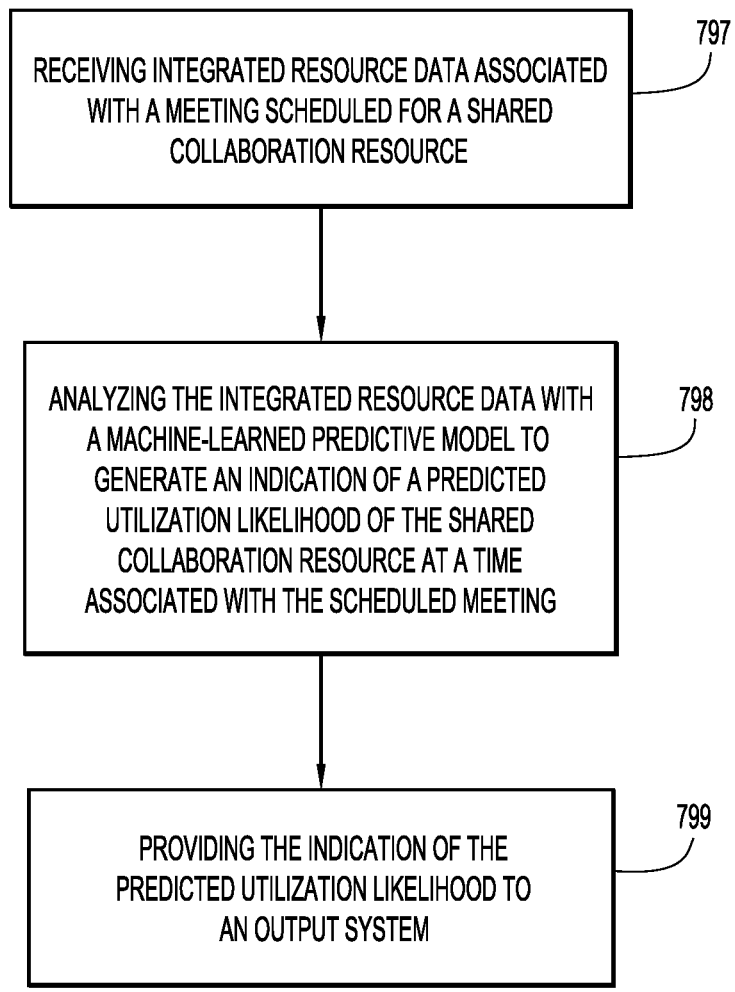
FIG. 7 is a flowchart of a method in accordance with examples presented herein.

FIG. 7 is a flowchart of a method 700 in accordance with examples presented herein. The method 700 begins at 797 wherein a computing device receives integrated resource data associated with a meeting scheduled for a shared collaboration resource. At 798, the computing device analyzes the integrated resource data with a machine-learned predictive model to generate an indication of a predicted utilization likelihood of the shared collaboration resource at a time associated with the scheduled meeting. At 799, the computing device provides the indication of the predicted utilization likelihood to an output system.

The techniques described herein can be used retrospectively for room utilization analysis and can also inform users in real-time time if a reserved room could be used for a scheduled or ad-hoc meeting. The techniques use multiple data points and modern data science techniques. Because the techniques presented herein predict the likelihood of the room utilization, a user requiring a room may be informed which reserved rooms are most likely to be available, even if the room is reserved. Armed with this information, a user can take action such as contacting a person who is unlikely to utilize a reserved room and request that the person allow the user to utilize the room instead. In an embodiment, a host feedback mechanism informs the host that one or more recurringly reserved rooms are frequently underutilized, thereby encouraging the host to make appropriate changes to the reservation (e.g., moving the reservation to a smaller room or cancelling the reservation) to avoid underutilization.

In one form, a computer-implemented method is provided. The method comprises: receiving integrated resource data associated with a meeting scheduled for a shared collaboration resource; analyzing the integrated resource data with a machine-learned predictive model to generate an indication of a predicted utilization likelihood of the shared collaboration resource at a time associated with the scheduled meeting; and providing the indication of the predicted utilization likelihood to an output system.

In another form, an apparatus is provided. The apparatus comprises: a memory; at least one communication interface configured to receive integrated resource data associated with a meeting scheduled for a shared collaboration resource; and one or more processors configured to: analyze the integrated resource data with a machine-learned predictive model to generate an indication of a predicted utilization likelihood of the shared collaboration resource at a time associated with the scheduled meeting, and provide the indication of the predicted utilization likelihood to an output system.

In another form, one or more non-transitory computer readable storage media are provided. The non-transitory computer readable storage media are encoded with instructions that, when executed by a processor, cause the processor to: receive integrated resource data associated with a meeting scheduled for a shared collaboration resource; analyze the integrated resource data with a machine-learned predictive model to generate an indication of a predicted utilization likelihood of the shared collaboration resource at a time associated with the scheduled meeting; and provide the indication of the predicted utilization likelihood to an output system.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   obtaining integrated resource data associated with a reserved shared collaboration resource that has been reserved for a meeting, wherein the meeting is scheduled for a time period, and the reserved shared collaboration resource is at least one of a physical conference room, a virtual conference room, or an electronic device;
   analyzing the integrated resource data using a machine-learned predictive model to generate a predicted utilization likelihood of the reserved shared collaboration resource during the time period associated with the meeting;
   providing information that causes display, to a user who is not associated with the scheduled meeting, of a reservation block for the meeting that is visually flagged based on the predicted utilization likelihood to indicate, before a start of the meeting, a likelihood that the reserved shared collaboration resource will be utilized during the time period; and
   obtaining attendee monitoring data generated by one or more physical sensors, wherein an actual utilization of the reserved shared collaboration resource during the meeting is determined based at least in part upon the attendee monitoring data.

2. The method of claim 1, wherein the attendee monitoring data comprises information describing if a meeting attendee joined the meeting.

3. The method of claim 2, wherein the reserved shared collaboration resource is the physical conference room, and the attendee monitoring data comprises information describing if the meeting attendee joined the meeting via a conferencing resource associated with the physical conference room.

4. The method of claim 1, further comprising:
updating one or more machine learning processes associated with the machine-learned predictive model based at least in part upon the predicted utilization likelihood and the actual utilization.

5. The method of claim 1, further comprising:
obtaining historical integrated resource data and historical utilization data associated with a past meeting using the reserved shared collaboration resource; and
training one or more machine learning processes associated with the machine-learned predictive model based on the historical integrated resource data and the historical utilization data.

6. One or more non-transitory computer readable storage media encoded with instructions that, when executed by a processor, cause the processor to:
obtain integrated resource data associated with a reserved shared collaboration resource that has been reserved for a meeting, wherein the meeting is scheduled for a time period, and the reserved shared collaboration resource is at least one of a physical conference room, a virtual conference room, or an electronic device;
analyze the integrated resource data using a machine-learned predictive model to generate a predicted utilization likelihood of the reserved shared collaboration resource during the time period associated with the meeting;
provide information that causes display, to a user who is not associated with the scheduled meeting, of a reservation block for the meeting that is visually flagged based on the predicted utilization likelihood to indicate, before a start of the meeting, a likelihood that the reserved shared collaboration resource will be utilized during the time period; and
obtain attendee monitoring data generated by one or more physical sensors, wherein an actual utilization of the reserved shared collaboration resource during the meeting is determined based at least in part upon the attendee monitoring data.

7. The one or more non-transitory computer readable storage media of claim 6, wherein the attendee monitoring data comprises information describing if a meeting attendee joined the meeting.

8. The one or more non-transitory computer readable storage media of claim 7, wherein the reserved shared collaboration resource is the physical conference room, and the attendee monitoring data comprises information describing if the meeting attendee joined the meeting via a conferencing resource associated with the physical conference room.

9. The one or more non-transitory computer readable storage media of claim 6, wherein the instructions further cause the processor to:
update one or more machine learning processes associated with the machine-learned predictive model based at least in part upon the predicted utilization likelihood and the actual utilization.

10. The one or more non-transitory computer readable storage media of claim 6, wherein the instructions further cause the processor to:
obtain historical integrated resource data and historical utilization data associated with a past meeting using the reserved shared collaboration resource; and
train one or more machine learning processes associated with the machine-learned predictive model based on the historical integrated resource data and the historical utilization data.

11. A collaboration system comprising:
one or more processors;
a communication interface operably coupled to at least one of the one or more processors; and
a memory storing instructions and operably coupled to at least one of the one or more processors, wherein the instructions, when executed by the system, cause the system to:
obtain integrated resource data associated with a reserved shared collaboration resource that has been reserved for a meeting, wherein the meeting is scheduled for a time period, and the reserved shared collaboration resource is at least one of a physical conference room, a virtual conference room, or an electronic device;
analyze the integrated resource data using a machine-learned predictive model to generate a predicted utilization likelihood of the reserved shared collaboration resource during the time period associated with the meeting;
provide information that causes display, to a user who is not associated with the scheduled meeting, of a reservation block for the meeting that is visually flagged based on the predicted utilization likelihood to indicate, before a start of the meeting, a likelihood that the reserved shared collaboration resource will be utilized during the time period; and
obtain attendee monitoring data generated by one or more physical sensors, wherein an actual utilization of the reserved shared collaboration resource during the meeting is determined based at least in part upon the attendee monitoring data.

12. The system of claim 11, wherein the attendee monitoring data comprises information describing if a meeting attendee joined the meeting.

13. The system of claim 12, wherein the reserved shared collaboration resource is the physical conference room, and the attendee monitoring data comprises information describing if the meeting attendee joined the meeting via a conferencing resource associated with the physical conference room.

14. The system of claim 11, wherein the instructions further cause the system to:
update one or more machine learning processes associated with the machine-learned predictive model based at least in part upon the predicted utilization likelihood and the actual utilization.

15. The system of claim 11, wherein the instructions further cause the system to:
obtain historical integrated resource data and historical utilization data associated with a past meeting using the reserved shared collaboration resource; and
train one or more machine learning processes associated with the machine-learned predictive model based on the historical integrated resource data and the historical utilization data.

16. The method of claim 1, wherein the reservation block is colored based on the predicted utilization likelihood.

17. The method of claim 1, wherein the reservation block is shaded based on the predicted utilization likelihood.

18. The method of claim 1, further comprising:
determining that the predicted utilization likelihood is below a threshold; and
providing, to the user, an indication that the predicted utilization likelihood is below the threshold.

19. The method of claim 1, wherein the reservation block indicates that the reserved shared collaboration resource has been reserved for the time period.

20. The one or more non-transitory computer readable storage media of claim 6, wherein the reservation block indicates that the reserved shared collaboration resource has been reserved for the time period.

\* \* \* \* \*